US011665773B2

(12) United States Patent
Huang et al.

(10) Patent No.: US 11,665,773 B2
(45) Date of Patent: May 30, 2023

(54) RESOURCE BASED PERIODIC COMMUNICATION CANCELLATION

(71) Applicant: QUALCOMM Incorporated, San Diego, CA (US)

(72) Inventors: Yi Huang, San Diego, CA (US); Jing Sun, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/191,069

(22) Filed: Mar. 3, 2021

(65) Prior Publication Data
US 2022/0287147 A1     Sep. 8, 2022

(51) Int. Cl.
*H04W 76/36* (2018.01)
*H04W 72/121* (2023.01)
*H04W 72/1268* (2023.01)
*H04W 72/23* (2023.01)
*H04W 72/50* (2023.01)

(52) U.S. Cl.
CPC ......... *H04W 76/36* (2018.02); *H04W 72/121* (2013.01); *H04W 72/1268* (2013.01); *H04W 72/23* (2023.01); *H04W 72/535* (2023.01)

(58) Field of Classification Search
None
See application file for complete search history.

(56) References Cited

U.S. PATENT DOCUMENTS

| 10,827,487 | B2 * | 11/2020 | Huang | H04W 72/0446 |
|---|---|---|---|---|
| 2019/0306848 | A1 * | 10/2019 | Zhou | H04W 72/044 |
| 2019/0342874 | A1 * | 11/2019 | Davydov | H04W 72/0413 |
| 2020/0112964 | A1 * | 4/2020 | Yang | H04L 5/0062 |
| 2020/0145967 | A1 * | 5/2020 | Park | H04W 72/042 |
| 2020/0178240 | A1 * | 6/2020 | Zhang | H04W 72/042 |
| 2020/0260391 | A1 * | 8/2020 | Zhou | H04W 52/146 |
| 2021/0168848 | A1 * | 6/2021 | Chatterjee | H04W 72/1242 |
| 2021/0194640 | A1 * | 6/2021 | Froberg Olsson | H04L 1/1835 |
| 2021/0329663 | A1 * | 10/2021 | Wong | H04W 72/1289 |
| 2021/0360669 | A1 * | 11/2021 | Taherzadeh Boroujeni | H04W 72/121 |
| 2021/0410154 | A1 * | 12/2021 | Islam | H04W 72/042 |
| 2022/0039115 | A1 * | 2/2022 | Sun | H04W 8/24 |
| 2022/0150014 | A1 * | 5/2022 | Wong | H04W 52/146 |
| 2022/0159683 | A1 * | 5/2022 | Islam | H04W 72/042 |

(Continued)

OTHER PUBLICATIONS

International Search Report and Written Opinion—PCT/US2022/070359—ISA/EPO—dated May 12, 2022.

(Continued)

*Primary Examiner* — Kodzovi Acolatse
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive group common downlink control information (GC-DCI) including an indication of a periodic communication cancellation resource pattern. The UE may selectively cancel a scheduled periodic communication occasion based at least in part on a determination of whether a resource associated with the scheduled periodic communication occasion overlaps with the periodic communication cancellation resource pattern. Numerous other aspects are described.

30 Claims, 10 Drawing Sheets

(56) References Cited

U.S. PATENT DOCUMENTS

| | | | |
|---|---|---|---|
| 2022/0159701 A1* | 5/2022 | Islam | H04L 5/0094 |
| 2022/0174682 A1* | 6/2022 | Li | H04W 72/10 |

OTHER PUBLICATIONS

Samsung: "UL Inter-UE Multiplexing/Prioritization", 3GPP Draft, 3GPP TSG RAN WG1 #98, R1-1908494 EURLLC UL CI_PI, 3rd Generation Partnership Project (3GPP), Mobile Competence Centre, 650, Route Des Lucioles, F-06921 Sophia-Antipolis Cedex, France, vol. RAN WG1, No. Prague, Czech Republic, May 26, 2019-May 30, 2019 Aug. 16, 2019 (Aug. 16, 2019), XP051765102, pp. 1-6, Retrieved from the Internet: URL: http://www.3gpp.org/ftp/tsg_ran/WG1_RL1/TSGR1_98/Docs/R1-1908494.zip [retrieved on Aug. 16, 2019] Paragraph [0001]—Paragraph [0003].

VIVO: "Summary#1 of UL Inter UE Tx Prioritization/Multiplexing", 3GPP Draft, 3GPP TSG RAN WG1 #98, R1-1909460 Summary#1 of UL Inter UE Tx Prioritization Multiplexing-V3_Clean, 3rd Generation Partnership Project (3GPP), Mobile Competence Centre, 650, Route Des Lucioles, F-06921 Sophia-A, vol. RAN WG1, No. Prague, CZ, Aug. 26, 2019-Aug. 30, 2019 Sep. 3, 2019 (Sep. 3, 2019), pp. 1-39, XP051766066, Retrieved from the Internet: URL: http://www.3gpp.org/ftp/tsg_ran/WG1_RL1/TSGR1_98/Docs/R1-1909460.zip [retrieved on Sep. 3, 2019] p. 27.

* cited by examiner

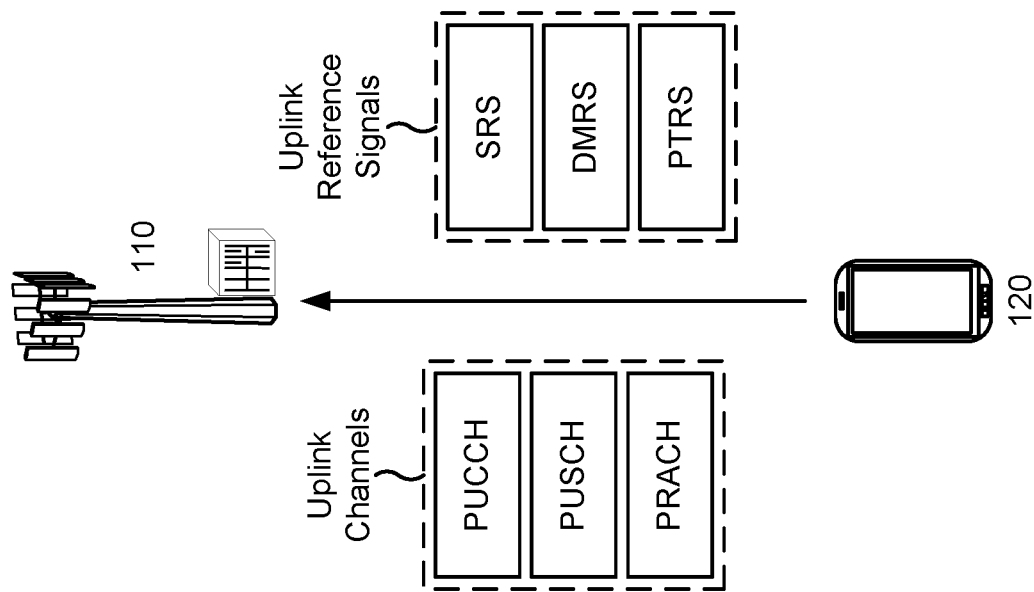
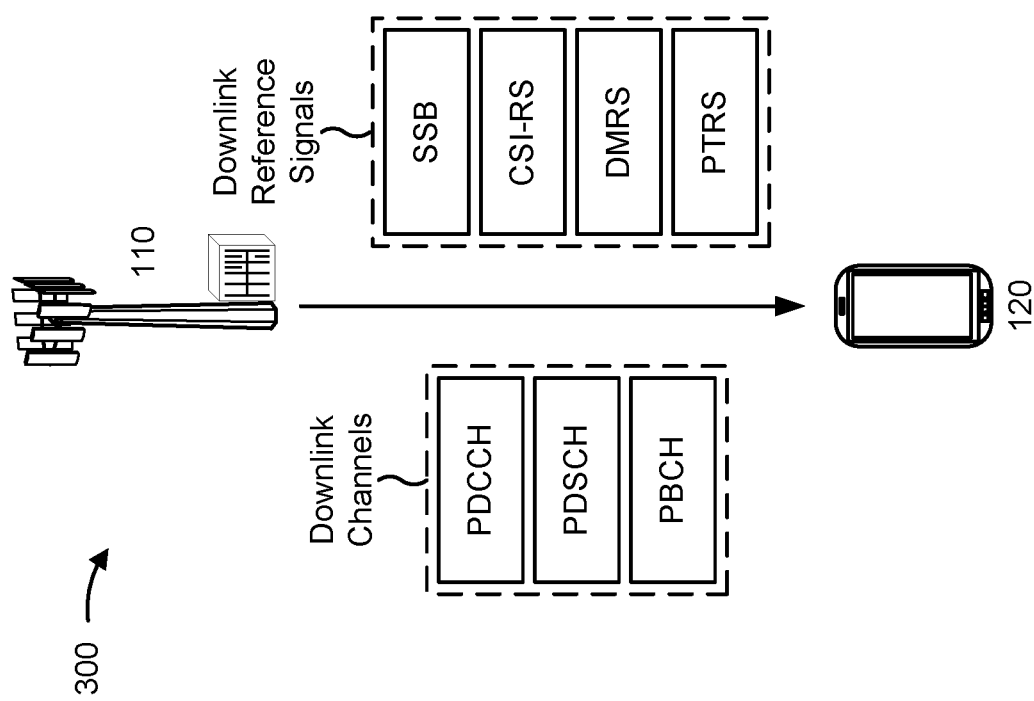
FIG. 3

RESOURCE BASED PERIODIC COMMUNICATION CANCELLATION

FIELD OF THE DISCLOSURE

Aspects of the present disclosure generally relate to wireless communication and to techniques and apparatuses for resource based periodic communication cancellation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a periodic communication configuration that schedules periodic communication occasions for the UE; receiving group common downlink control information (GC-DCI) including an indication of a periodic communication cancellation resource pattern, wherein the periodic communication cancellation resource pattern is a set of resources that preempts overlapping scheduled periodic communication occasions for the UE; and selectively canceling a scheduled periodic communication occasion based at least in part on a determination of whether a resource associated with the scheduled periodic communication occasion overlaps with the periodic communication cancellation resource pattern.

In some aspects, a method of wireless communication performed by a base station includes transmitting, to one or more UEs in a group of UEs, respective periodic communication configurations that schedule periodic communication occasions for the one or more UEs; and transmitting, to the group of UEs, GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern.

In some aspects, a UE for wireless communication includes a memory and one or more processors, operatively coupled to the memory, configured to: receive a periodic communication configuration that schedules periodic communication occasions for the UE; receive GC-DCI including an indication of a periodic communication cancellation resource pattern, wherein the periodic communication cancellation resource pattern is a set of resources that preempts overlapping scheduled periodic communication occasions for the UE; and selectively cancel a scheduled periodic communication occasion based at least in part on a determination of whether a resource associated with the scheduled periodic communication occasion overlaps with the periodic communication cancellation resource pattern.

In some aspects, a base station for wireless communication includes a memory and one or more processors, operatively coupled to the memory, configured to: transmit, to one or more UEs in a group of UEs, respective periodic communication configurations that schedule periodic communication occasions for the one or more UEs; and transmit, to the group of UEs GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern.

In some aspects, a non-transitory computer-readable medium storing a set of instructions for wireless communication includes one or more instructions that, when executed by one or more processors of a UE, cause the UE to: receive a periodic communication configuration that schedules periodic communication occasions for the UE; receive GC-DCI including an indication of a periodic communication cancellation resource pattern, wherein the periodic communication cancellation resource pattern is a set of resources that preempts overlapping scheduled periodic communication occasions for the UE; and selectively cancel a scheduled periodic communication occasion based at least in part on a determination of whether a resource associated with the scheduled periodic communication occasion overlaps with the periodic communication cancellation resource pattern.

In some aspects, a non-transitory computer-readable medium storing a set of instructions for wireless communication includes one or more instructions that, when executed by one or more processors of a base station, cause the base station to: transmit, to one or more UEs in a group of UEs, respective periodic communication configurations that schedule periodic communication occasions for the one or more UEs; and transmit, to the group of UEs, GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern.

In some aspects, an apparatus for wireless communication includes means for receiving a periodic communication configuration that schedules periodic communication occasions; means for receiving GC-DCI including an indication of a periodic communication cancellation resource pattern, wherein the periodic communication cancellation resource pattern is a set of resources that preempts overlapping scheduled periodic communication occasions; and means for selectively canceling a scheduled periodic communication occasion based at least in part on a determination of whether a resource associated with the scheduled periodic communication occasion overlaps with the periodic communication cancellation resource pattern.

In some aspects, an apparatus for wireless communication includes means for transmitting, to one or more UEs in a group of UEs, respective periodic communication configurations that schedule periodic communication occasions for the one or more UEs; and means for transmitting, to the group of UEs, GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
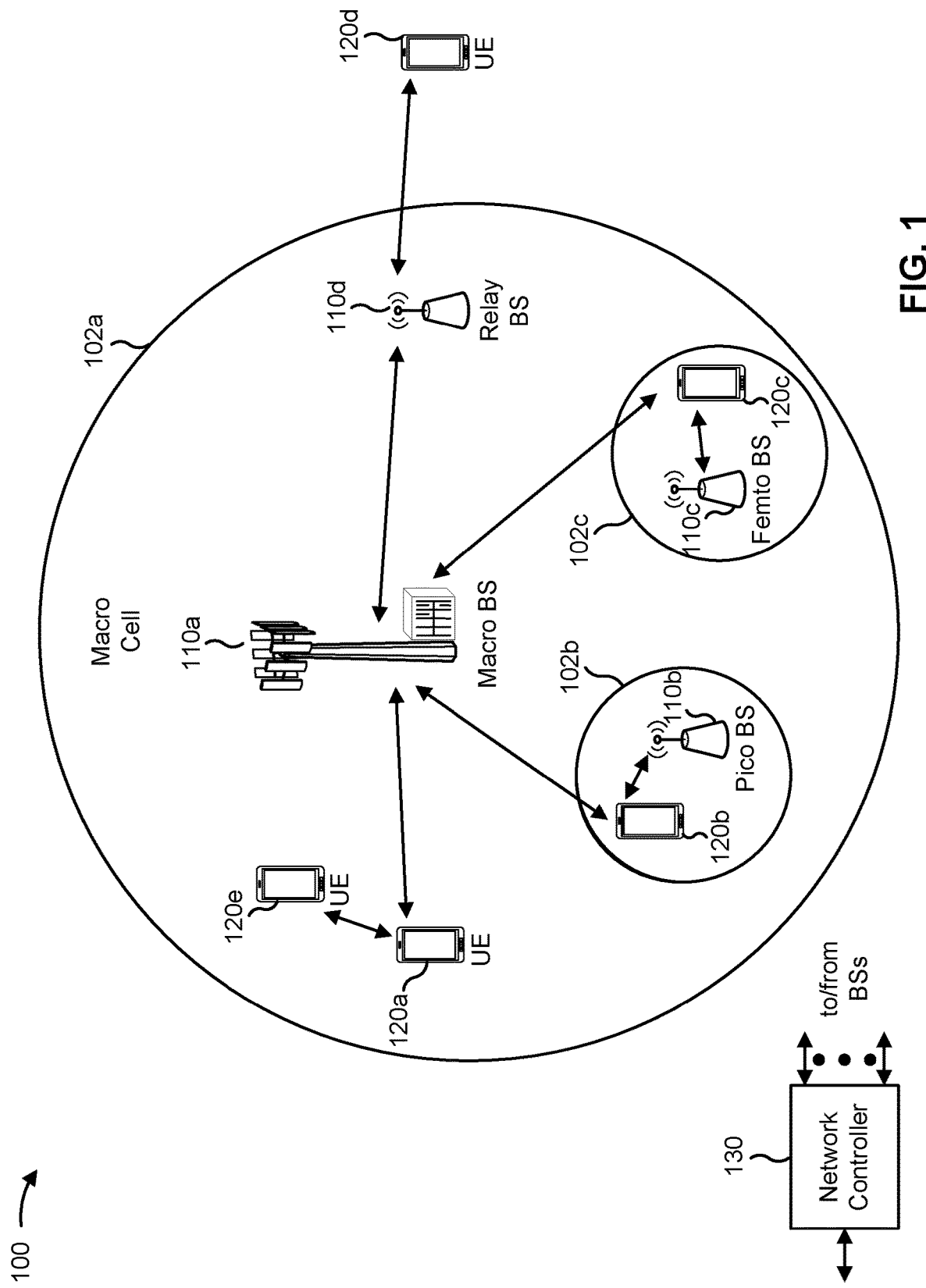
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
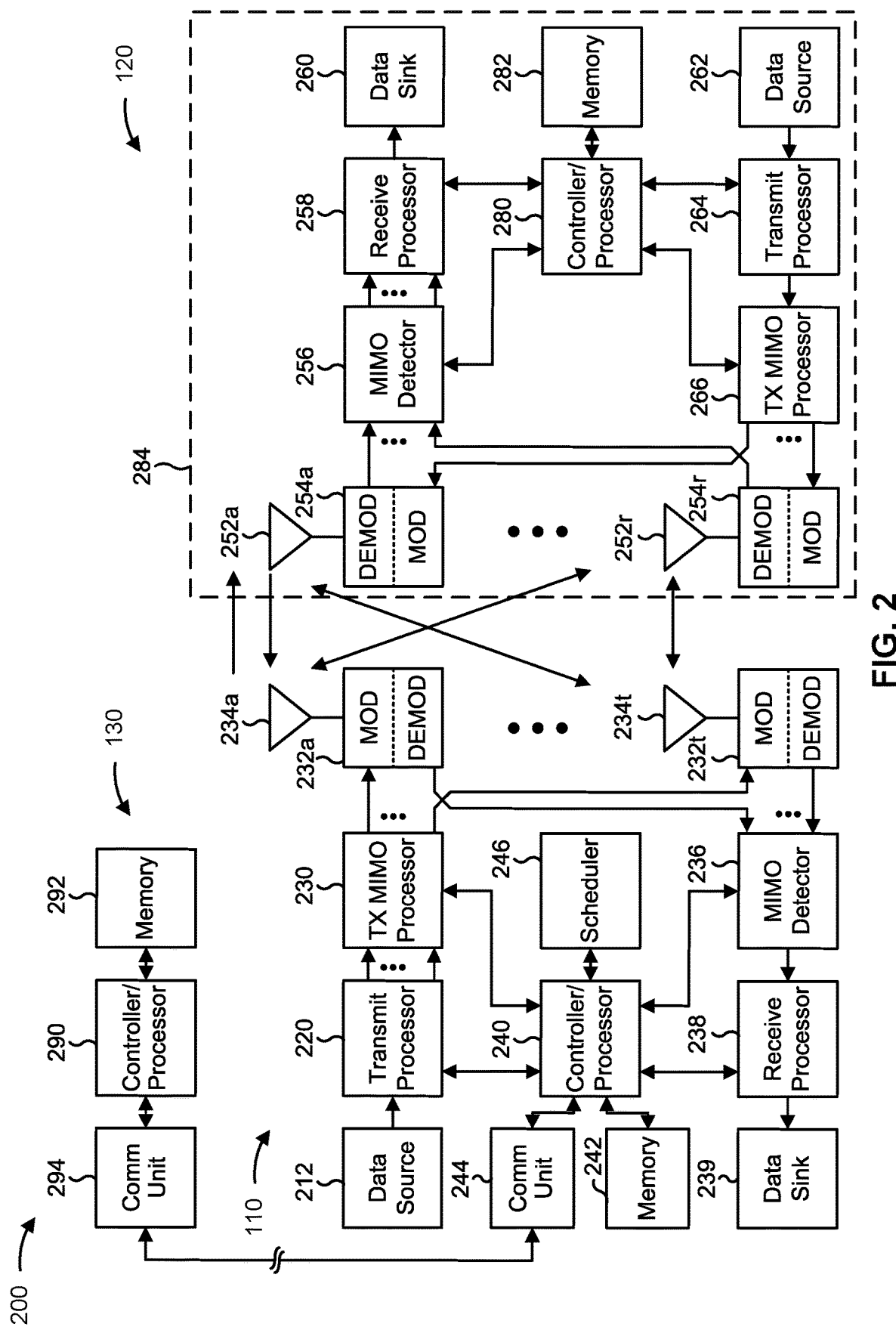
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T ≥1 and R ≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-8.

Controller/processor 240 of base station 110, controller/processor 280 of UE 120, and/or any other component(s) of FIG. 2 may perform one or more techniques associated with resource based periodic communication cancellation, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include miming the instructions, converting the instructions, compiling the instructions, and/or interpreting the instructions, among other examples.

In some aspects, the UE 120 includes means for receiving a periodic communication configuration that schedules periodic communication occasions for the UE (e.g., using antenna 252, DEMOD 254, MIMO detector 256, receive processor 258, controller/processor 280, memory 282, or the like); means for receiving group common downlink control information (GC-DCI) including an indication of a periodic communication cancellation resource pattern, wherein the periodic communication cancellation resource pattern is a set of resources that preempts overlapping scheduled periodic communication occasions for the UE (e.g., using antenna 252, DEMOD 254, MIMO detector 256, receive processor 258, controller/processor 280, memory 282, or the like); and/or means for selectively canceling a scheduled periodic communication occasion based at least in part on a determination of whether a resource associated with the scheduled periodic communication occasion overlaps with the periodic communication cancellation resource pattern (e.g., using controller/processor 280, memory 282, or the like). The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for canceling monitoring and/or reception for a downlink transmission in the scheduled SPS occasion based at least in part on a determination that a resource associated with the scheduled SPS transmission overlaps with the SPS cancellation resource pattern.

In some aspects, the UE 120 includes means for canceling monitoring and/or reception for the downlink transmission in the scheduled SPS occasion without canceling monitoring and/or reception for a dynamic grant scheduled downlink transmission scheduled to be transmitted in a resource that overlaps with the SPS cancellation resource pattern.

In some aspects, the UE 120 includes means for canceling the scheduled periodic communication occasion, based at least in part on a determination that the resource associated with the scheduled periodic communication occasion overlaps with the periodic communication cancellation resource pattern, without canceling a scheduled aperiodic communication scheduled to be transmitted or received in a resource that overlaps with the periodic communication cancellation resource pattern.

In some aspects, the base station 110 includes means for transmitting, to one or more UEs in a group of UEs, respective periodic communication configurations that schedule periodic communication occasions for the one or more UEs (e.g., using controller/processor 240, transmit processor 220, TX MIMO processor 230, MOD 232, antenna 234, memory 242, or the like); and/or means for transmitting, to the group of UEs, GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern (e.g., using controller/processor 240, transmit processor 220, TX MIMO processor 230, MOD 232, antenna 234, memory 242, or the like). The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, a SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error. As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
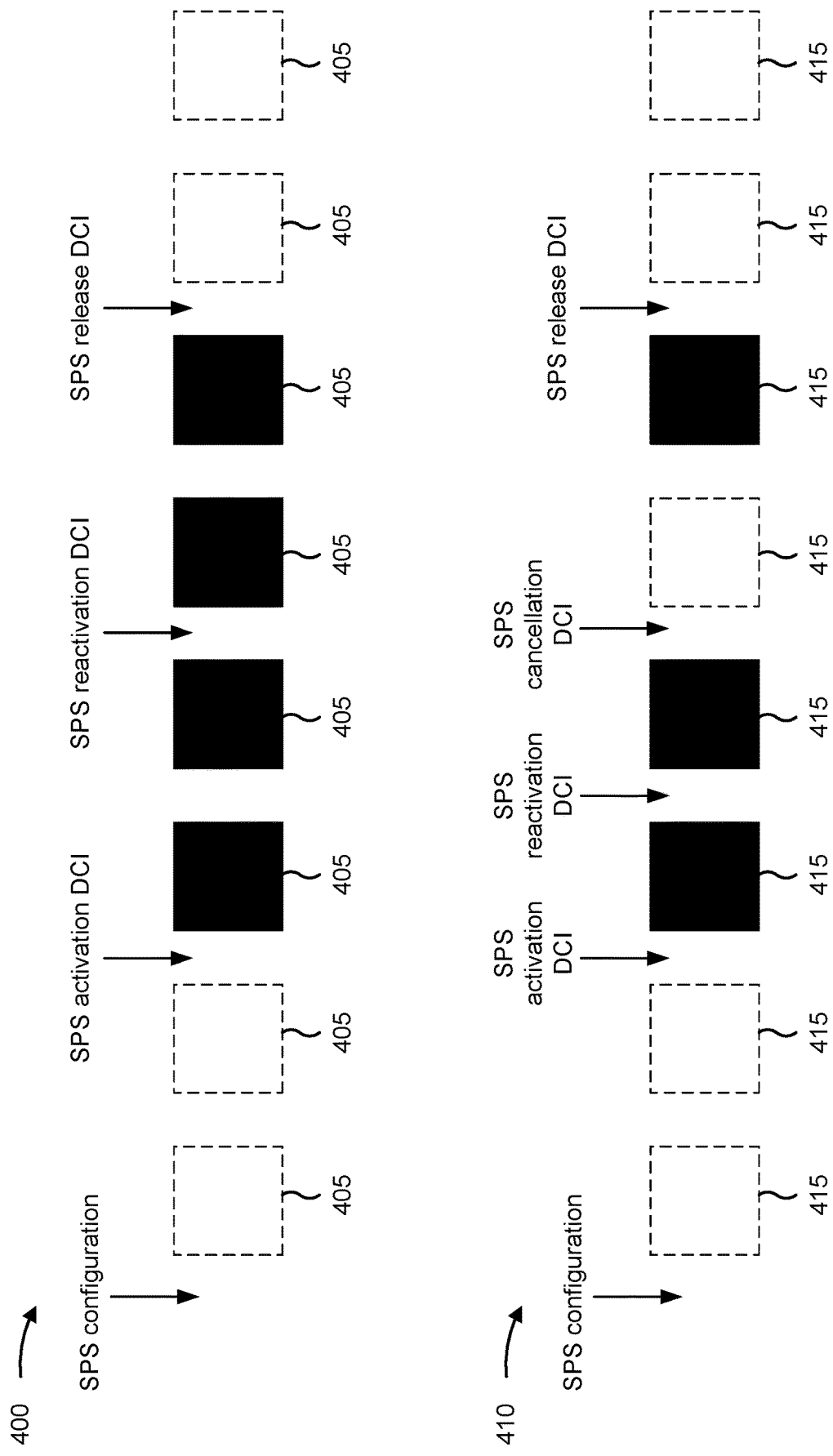
FIG. 4 is a diagram illustrating examples of downlink semi-persistent scheduling (SPS), in accordance with the present disclosure.

FIG. 4 is a diagram illustrating examples 400 and 410 of downlink semi-persistent scheduling (SPS), in accordance with the present disclosure.

As shown in example 400, a UE may be configured with an SPS configuration for SPS downlink communications. For example, the UE may receive the SPS configuration via a radio resource control (RRC) message transmitted by a base station. The SPS configuration may indicate a resource allocation associated with SPS downlink communications and a periodicity at which the resource allocation is repeated, resulting in periodically reoccurring scheduled SPS occasions 405 for the UE. The SPS configuration may also configure hybrid automatic repeat request (HARQ) ACK (HARQ-ACK) feedback resources for the UE to transmit HARQ-ACK feedback for SPS PDSCH communications received in the SPS occasions 405. For example, the SPS configuration may indicate a PDSCH-to-HARQ feedback timing value, which may be referred to as a K1 value in the 3GPP standard.

The base station may transmit SPS activation DCI to the UE to activate the SPS configuration for the UE. The base station may indicate, in the SPS activation DCI, transmission parameters, such as MCS, resource block (RB) allocation, and/or antenna ports, for the SPS PDSCH communications to be transmitted in the scheduled SPS occasions 405. The UE may begin monitoring the SPS occasions 405 based on receiving the SPS activation DCI. For example, beginning with a next scheduled SPS occasion subsequent to receiving the SPS activation DCI, the UE may monitor the scheduled SPS occasions 405 to decode PDSCH communications based on the transmission parameters indicated in the SPS activation DCI. The UE may not monitor configured SPS occasions 405 prior to receiving the SPS activation DCI.

The base station may transmit SPS reactivation DCI to the UE to change the transmission parameters, such as the MCS, RB allocation, and/or antenna ports, for the SPS PDSCH communications. Based on receiving the SPS reactivation DCI, and the UE may begin monitoring the scheduled SPS occasions 405 using the transmission parameters indicated in the SPS reactivation DCI. For example, beginning with a next scheduled SPS occasion subsequent to receiving the SPS reactivation DCI, the UE may monitor the scheduled SPS occasions 405 to decode PDSCH communications based on the transmission parameters indicated in the SPS reactivation DCI.

The base station may transmit SPS release DCI to the UE to deactivate the SPS configuration for the UE. The UE may stop monitoring the scheduled SPS occasions 405 based on receiving the SPS release DCI. For example, the UE may not monitor any scheduled SPS occasions 405 until another SPS activation DCI is received from the base station.

As shown in example 410, the UE may receive, from a base station, an SPS configuration that configures periodically occurring scheduled SPS occasions 415 for the UE. In some cases, such as when the base station does not have downlink traffic to transmit to the UE, the base station may transmit SPS cancellation DCI to the UE to temporarily cancel or deactivate one or more subsequent SPS occasions 415 for the UE. Whereas the SPS release DCI deactivates all subsequent SPS occasions 415 for a given SPS configuration for the UE until the given SPS configuration is activated again by a new SPS activation DCI, the SPS cancellation DCI may deactivate only a subsequent one SPS occasion 415 or a subsequent n SPS occasions 415 (where n is an integer). SPS occasions 415 after the one or n SPS occasions 415 subsequent to the SPS cancellation DCI may remain activated. Based on receiving the SPS cancellation DCI, the UE may skip monitoring the one or n SPS occasions 415 subsequent to receiving the SPS cancellation DCI. As shown in example 410, the SPS cancellation DCI cancels one subsequent SPS occasion 415 for the UE. After the SPS occasion 415 (or n SPS occasions) subsequent to receiving the SPS cancellation DCI, the UE may automatically resume monitoring the scheduled SPS occasions 415. For example, the UE may resume monitoring the scheduled SPS occasions 415 and continue monitoring the scheduled SPS occasions 415 until the SPS release DCI is received from the base station.

As indicated above, FIG. 4 is provided as an example. Other examples may differ from what is described with respect to FIG. 4.

As described above in connection with FIG. 4, a base station may use SPS cancellation DCI to temporarily cancel one or more subsequent SPS occasions for a particular UE. For example, the base station may transmit the SPS cancellation DCI to a UE to cancel a subsequent SPS occasion when the base station does not have downlink traffic to transmit in that SPS occasion. This may result in reduced power consumption for the UE and may allow network resources associated with the SPS occasion to be reallocated. However, the SPS cancellation DCI is transmitted to a particular UE and only cancels one or more SPS occasions for that UE. The base station may have a large number of UEs with activate SPS configurations in a coverage area of the base station. The base station may require a large signaling overhead to transmit SPS cancellation DCI to a large number UEs. This may result in reduced network speed and increased consumption for network resources for control signaling. Furthermore, the base station may need to determine which UEs to target with the SPS cancellation DCI and how many subsequent scheduled SPS occasions to cancel, which may consume computing resources (e.g., processing resources and/or memory resources).

Some techniques and apparatuses described herein enable a base station to transmit, to a group of UEs, GC-DCI that includes an indication of a periodic communication cancellation resource pattern that preempts scheduled periodic communication occasions for the UEs in the group of UEs. As used herein, the periodic communication cancellation resource pattern is a resource pattern indicating resources that should not be used for a periodic communication. A UE may receive the GC-DCI including the indication of the periodic communication cancellation resource pattern. The UE may selectively cancel a scheduled periodic communication occasion based at least in part on a determination of whether a resource associated with the scheduled periodic communication occasion overlaps with the periodic communication cancellation resource pattern. As used herein, selectively canceling refers to the UE selecting which periodic communications to cancel, where the selection is based on the periodic communication cancellation resource pattern. As a result, the base station may use a single GC-DCI transmission to temporarily cancel periodic communication occasions, such as SPS occasions, for multiple UEs, resulting in decreased signaling overhead as compared with transmitting SPS cancellation DCI to each of the UEs. This may cause increased network speed due to the reduced signaling overhead, and reduced power consumption for the UEs. Furthermore, because the base station indicates a resource pattern for which periodic communication occasions are preempted, and the UEs determine whether scheduled periodic communication occasions overlap with the resource pattern, the base station may not need to determine which periodic communication occasions to cancel for which UEs or which UEs have which periodic communication configuration. This may result in reduced consumption of computing resources by the base station, as compared with the base station determining which UEs to transmit SPS cancellation DCI to and which SPS occasions to cancel.

In some aspects, the periodic communication cancellation resource pattern may only preempt periodic communication occasions associated with periodic communications, such as SPS downlink communications, periodically scheduled uplink (e.g., PUSCH) communications, and/or periodically scheduled reference signal transmission, without preempting aperiodic communications, such as dynamic grant scheduled downlink or uplink communications. As a result, the base station may temporarily cancel periodic communication occasions that overlap with the periodic communication cancellation resource pattern for a group of UEs, without canceling dynamically scheduled downlink and/or uplink communications, which may have a higher priority than the periodic communications.

Figure 5:
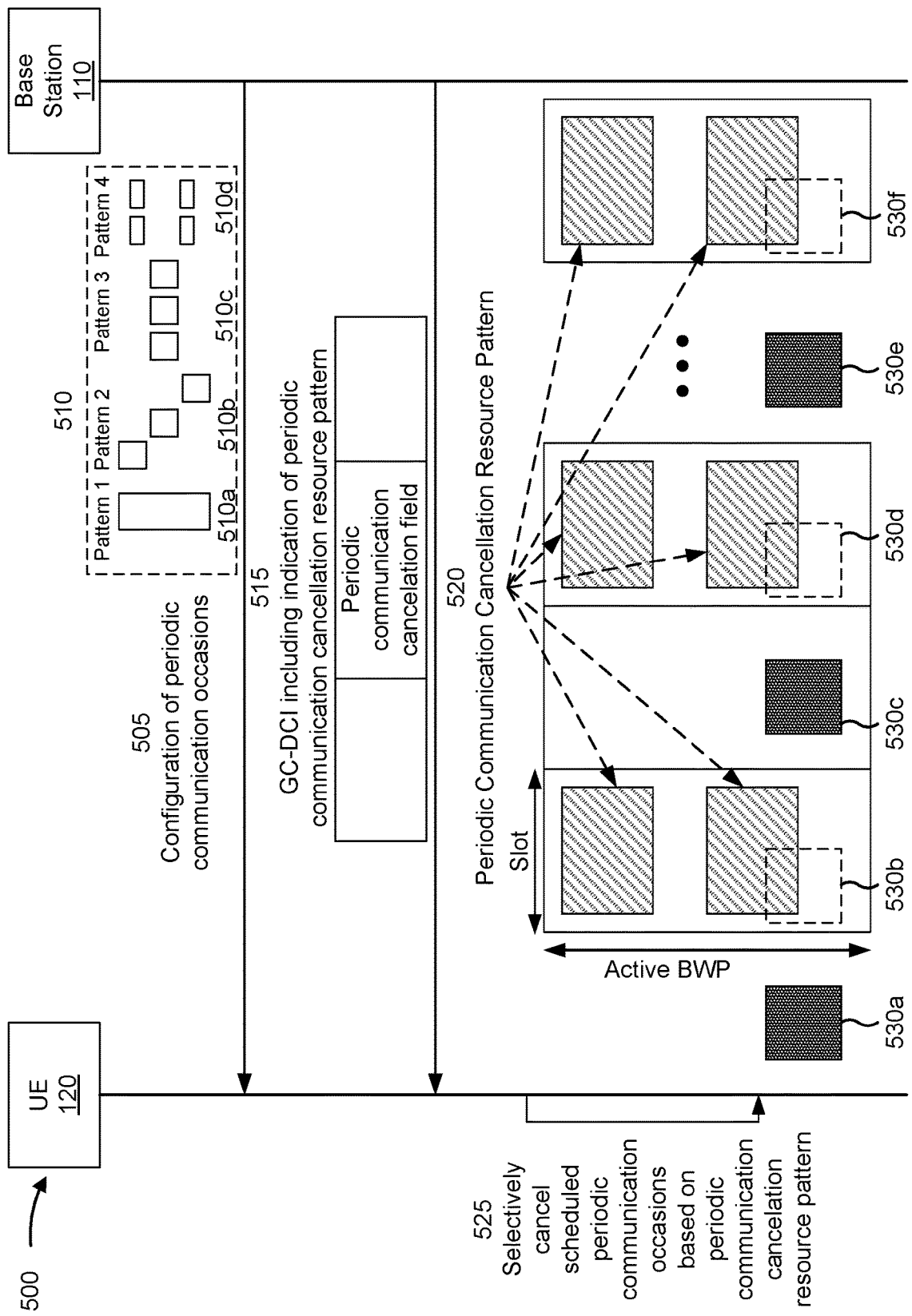
FIGS. 5-6 are diagrams illustrating examples associated with resource based periodic communication cancellation, in accordance with the present disclosure.

FIG. 5 is a diagram illustrating an example 500 associated with resource based periodic communication cancellation, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 5, and by reference number 505, the base station 110 may transmit, to the UE 120, a configuration of periodic communication occasions. The periodic communication occasions may be reoccurring occasions associated with periodic communications to be received or transmitted by the UE 120. Periodic communications refer to communications (e.g., transmissions from the base station 110 to the UE 120, transmissions from the UE 120 to the base station 110, and/or transmissions from the UE 120 to another UE 120) that are scheduled to reoccur with a certain periodicity. Periodic communications may include SPS communications. For example, the periodic communications may include SPS downlink (e.g., PDSCH) communications, scheduled periodic uplink (e.g., PUSCH) communications, periodic reference signal transmission by the UE 120 (e.g., to the base station 110 or to another UE), and/or periodic reference signal transmissions to the UE 120 (e.g., from the base station 110 or from another UE). The configuration of the periodic communication occasions (e.g., "periodic communication configuration") may configure the periodicity of the periodic communications and may allocate reoccurring resources for the periodic communications (e.g., resources for receiving and/or transmitting the periodic communications by the UE 120).

In some aspects, the configuration may be an SPS configuration and the periodic communication occasions may be SPS occasions for the UE 120 to monitor to receive downlink (e.g., PDSCH) communications from the base station 110. In some aspects, the periodic communication occasions may be scheduled periodic uplink (e.g., PUSCH) transmission occasions for the UE 120. In some aspects, the periodic communication occasions may be scheduled occasions for receiving a periodic reference signal, such as a CSI-RS (e.g., periodic CSI-RS and/or semi-persistent CSI-RS), from the base station 110 by the UE 120. In some aspects, the periodic communication occasions may be scheduled occasions for transmitting a periodic reference signal, such as an SRS (e.g., periodic SRS and/or semi-persistent SRS) to the base station 110 by the UE 120.

In some aspects, the base station 110 may transmit the configuration of the periodic communication occasions to the UE 120 in an RRC message. In some aspects, the base station 110 may transmit, to the UE 120 and one or more other UEs in a group of UEs, respective configurations of periodic communication occasions. For example, the base station 110 may transmit, to each of the UE 120 and the one or more other UEs, a respective RRC message including the configuration of the periodic communication occasions for that UE.

As shown by reference number 510, the configuration of the periodic communication occasions for the UE 120 may include a configuration of multiple periodic communication cancellation resource patterns 510a-510d. For example, the configuration of the periodic communications may include information identifying a plurality of configured periodic communication cancellation resource patterns 510a-510d and respective index values associated with the configured periodic communication cancellation resource patterns 510a-510d. Each of the configured periodic communication cancellation resource patterns 510a-510d may identify a respective set of resources in the time domain and the frequency domain. In some aspects, the base station 110 may transmit a configuration of multiple periodic communication cancellation resource patterns 510a-510d to the UE 120 in a separate communication (e.g., a separate RRC message) from the configuration of the periodic communication occasions for the UE 120.

As further shown in FIG. 5, and by reference number 515, the base station 110 may transmit, to the UE 120, GC-DCI including an indication of a periodic communication cancellation resource pattern 520. The base station 110 may transmit the GC-DCI including the indication of the periodic communication cancellation resource pattern 520 to the UE 120 and one or more other UEs in a group of UEs. In some aspects, the base station 110 may groupcast the GC-DCI to the group of UEs. The GC-DCI may include a group ID shared by the UE 120 and the other UEs in the group of UEs. In some aspects, the base station 110 may broadcast the DCI including the indication of the periodic communication cancellation resource pattern 520 to all UEs in a coverage area associated with the base station 110.

The GC-DCI may include a periodic communication cancellation field, and the indication of the periodic communication cancellation resource pattern 520 may be included in the periodic communication cancellation field. As shown by reference number 520, the periodic communication cancellation resource pattern 520 may include a set of resources in the time domain and the frequency domain. The resources included in the periodic communication cancellation resource pattern 520 may preempt overlapping scheduled periodic communication occasions. For example, the resources included in the periodic communication cancellation resource pattern 520 may preempt resources, associated with scheduled periodic communication occasions for the UE 120 and the other UEs in the UE 120 group, that overlap with the resources in the periodic communication cancellation resource pattern 520. The set of resources in the periodic communication cancellation resource pattern 520 may be identified with any granularity in the frequency domain and/or the time domain. For example, the indication in the periodic communication cancellation field may identify resources in the frequency domain per RB, per bandwidth part (BWP), or per RB group, among other examples.

The indication in the periodic communication cancellation field may identify resources in the time domain per slot, per multiple slots (e.g., with a certain periodicity), per OFDM symbol, or per multiple OFDM symbols (e.g., with a certain periodicity). In some aspects, the set of resources in the periodic communication cancellation resource pattern 520 may also include resources in the spatial domain (e.g., MIMO layers). In this case, the indication in the periodic communication cancellation field may also identify the resources in the spatial domain by identifying a set of MIMO layers for the periodic communication cancellation resource pattern 520.

In some aspects, the indication may include information that identifies the resources to be included in the periodic communication cancellation resource pattern 520. For example, the indication, in the periodic communication cancellation field, may include a two-dimensional bit map that identifies the resources in the time domain (e.g., by slot or OFDM symbol) and frequency domain (e.g., by RB or BWP). In this case, the base station 110 may dynamically select the resources to be included in the periodic communication cancellation resource pattern 520. In some aspects, the indication, in the periodic communication cancellation field, may include a multi-dimensional bit map (e.g., three-dimensional bit map) that identifies the resources in the time domain (e.g., by slot or OFDM symbol), the frequency domain (e.g., by RB or BWP), and the spatial domain (e.g., by set of MIMO layers).

In some aspects, the indication may include an index value associated with a configured periodic communication cancellation resource pattern (e.g., 510*a*, 510*b*, 510*c*, or 510*d*). For example, as described above in connection with reference number 510, the base station 110 may include, in the configuration of the periodic communication occasions transmitted to the UE 120 (or in a separate communication), information identifying a plurality of configured periodic communication cancellation resource patterns 510*a*-510*b* and respective index values associated with the configured periodic cancellation resource patterns 510*a*-510*d*. In this case, the indication, in the periodic communication cancellation field, may include the respective index value associated with one of the configured periodic communication cancellation resource patterns (e.g., 510*a*, 510*b*, 510*c*, or 510*d*) that is selected by the base station 110 as the periodic communication cancellation resource pattern 520.

As further shown in FIG. 5, and by reference number 525, the UE 120 may selectively cancel one or more scheduled periodic communication occasions based at least in part on the periodic communication cancellation resource pattern 520 indicated in the GC-DCI. In some aspects, the UE 120 may selectively cancel one or more scheduled periodic communication occasions based at least in part on a determination of whether resources associated with the scheduled periodic communication occasions overlap with the periodic communication cancellation resource pattern 520. As used herein, selectively canceling one or more periodic communication occasions, refers to the UE 120 selecting whether to cancel the one or more periodic communications occasions based on the periodic communication cancellation resource pattern 520. For example, the UE may select to cancel a scheduled periodic communication occasion based on a determination that a resource associated with the scheduled periodic communication occasion overlaps with the periodic communication cancellation resource pattern 520, and the UE may select not to cancel a scheduled periodic communication occasion based on a determination that a resource associated with the scheduled periodic communication does not overlap with the periodic communication cancellation resource pattern 520.

As shown in FIG. 5, scheduled periodic communication occasions 530 for the UE 120 may include periodic communication occasions 530*a*, 530*b*, 530*c*, 530*d*, 530*e*, and 530*f*. For example, the scheduled periodic communication occasion 530 may be SPS occasions (e.g., occasions associated with monitoring for SPS downlink transmissions from the base station 110), occasions associated with scheduled periodic uplink transmissions for the UE 120, occasions associated with receiving a periodic reference signal from the base station 110, or occasions associated with transmitting a periodic reference signal to the base station 110. Each scheduled periodic communication occasion 530 may be associated with a respective resource allocated for the periodic communication to be received or transmitted by the UE 120. For each scheduled periodic communication occasion 530, the UE 120 may determine whether the resource associated with that scheduled periodic communication occasion 530 overlaps with the periodic communication cancellation resource pattern 520. The UE 120 may determine that the resource associated with a scheduled periodic communication occasion 530 overlaps with the periodic communication cancellation resource pattern 520 based on a determination that the resource overlaps with at least one resource in the periodic communication cancellation resource pattern 520.

The UE 120 may cancel a scheduled periodic communication occasion 530 based at least in part on a determination that the scheduled periodic communication occasion 530 overlaps with the periodic communication cancellation resource pattern 520. In this case, the UE 120 may skip the canceled periodic communication occasion 530. For example, the UE 120 may not transmit, receive, and/or monitor for the periodic communication scheduled for that periodic communication occasion 530. The UE 120 may automatically (e.g., without receiving additional signaling from the base station 110) resume transmitting, receiving, and/or monitoring for the periodic communication in a next non-canceled scheduled periodic communication occasion 530 (e.g., a next scheduled periodic communication occasion 530 that does not overlap with the periodic communication cancellation resource pattern 520). As shown in FIG. 5, the UE 120 may cancel periodic communication occasions 530*b*, 530*d*, and 530*f* based at least in part on determinations, by the UE 120, that the resources associated with periodic communication occasions 530*b*, 530*d*, and 530*f* overlap with the periodic communication cancellation resource pattern 520.

In some aspects, the resources in the periodic communication cancellation resource pattern 520 may preempt only scheduled periodic communication occasions for the UE 120, and not scheduled aperiodic communications, such as dynamic grant scheduled communications (e.g., dynamic grant PDSCH transmissions and/or dynamic grant PUSCH transmissions). In this case, the UE 120 may cancel one or more scheduled periodic communication occasions (e.g., 530*b*, 530*d*, and 530*f*) based at least in part on determinations that the resources associated with those scheduled periodic communication occasions overlap with the periodic communication cancellation resource pattern 520, without canceling a scheduled aperiodic communication (e.g., a dynamic grant scheduled downlink or uplink communication) that is scheduled to be transmitted or received in a resource that overlaps with the periodic communication cancellation resource pattern 520.

As described above in connection with FIG. 5, the base station 110 may transmit, to the UE 120 and one or more other UEs in a group of UEs, GC-DCI that includes an indication of a periodic communication cancellation resource pattern that preempts scheduled periodic communication occasions for the UEs in the group of UEs. The UE 120 may receive the GC-DCI including the indication of the periodic communication cancellation resource pattern. The UE 120 may selectively cancel a scheduled periodic communication occasion based at least in part on a determination of whether a resource associated with the scheduled periodic communication occasion overlaps with the periodic communication cancellation resource pattern. As a result, the base station 110 may use a single GC-DCI transmission to temporarily cancel periodic communication occasions for multiple UEs, resulting in decreased signaling overhead as compared with transmitting SPS cancellation DCI to individual UEs. This may cause increased network speed due to the reduced signaling overhead, and reduced power consumption for the UEs.

As indicated above, FIG. 5 is provided as an example. Other examples may differ from what is described with respect to FIG. 5.

Figure 6:
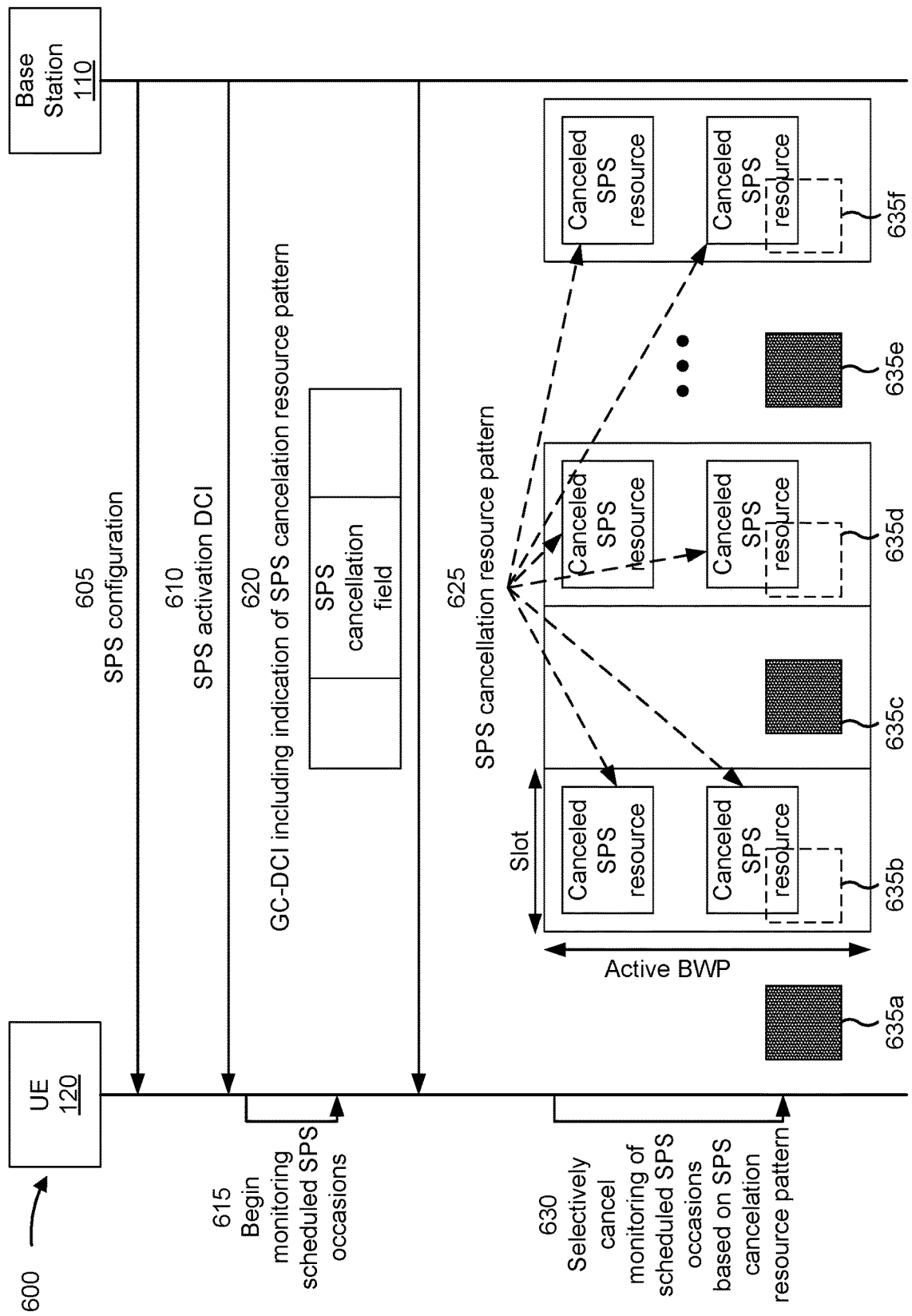

FIG. 6 is a diagram illustrating an example 600 associated with resource based periodic communication cancellation, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 6, and by reference number 605, the base station 110 may transmit, to the UE 120, an SPS configuration for SPS downlink communications. For example, the base station 110 may transmit, to the UE 120, an RRC message including the SPS configuration. The SPS configuration may indicate a resource allocation associated with SPS downlink communications and a periodicity at which the resource allocation is repeated, resulting in periodically reoccurring scheduled SPS occasions for the UE 120. The SPS configuration may also configure HARQ-ACK feedback resources for the UE to transmit HARQ-ACK feedback for SPS PDSCH communications received in the scheduled SPS occasions. For example, the SPS configuration may include an indication of a PDSCH-to-HARQ feedback timing value.

In some aspects, the SPS configuration may include a configuration of multiple SPS cancellation resource patterns. For example, the configuration of the periodic communications may include information identifying a plurality of configured SPS cancellation resource patterns and respective index values associated with the configured SPS cancellation resource patterns. Each of the configured SPS cancellation resource patterns may identify a respective set of resources in the time domain and the frequency domain. In some aspects, the base station 110 may transmit a configuration of multiple SPS cancellation resource patterns to the UE 120 in a separate communication (e.g., a separate RRC message) from the SPS configuration.

As further shown in FIG. 6, and by reference number 610, the base station 110 may transmit, to the UE 120, SPS activation DCI to activate the SPS configuration for the UE 120. The SPS activation DCI may include indications of transmission parameters for the SPS PDSCH communications to be transmitted in the scheduled SPS occasions. For example, the transmission parameters may include MCS, RB allocation, and/or antenna ports to be used to transmit the SPS PDSCH communications in the scheduled SPS occasions.

As further shown in FIG. 6, and by reference number 615, the UE 120 may begin monitoring the scheduled SPS occasions based at least in part on receiving the SPS activation DCI. For example, beginning with a next scheduled SPS occasion subsequent to receiving the SPS activation DCI, the UE may monitor the scheduled SPS occasions to decode PDSCH communications based on the transmission parameters indicated in the SPS activation DCI.

As further shown in FIG. 6, and by reference number 620, the base station 110 may transmit, to the UE 120, GC-DCI including an indication of an SPS cancellation resource pattern 625. The base station 110 may transmit the GC-DCI including the indication of the SPS cancellation resource pattern 625 to the UE 120 and one or more other UEs in a group of UEs. In some aspects, the base station 110 may groupcast the GC-DCI to the group of UEs. The GC-DCI may include a group ID shared by the UE 120 and the other UEs in the group of UEs. In some aspects, the base station 110 may broadcast the DCI including the indication of the SPS cancellation resource pattern 625 to all UEs in a coverage area associated with the base station 110.

The GC-DCI may include an SPS cancellation field, and the indication of the SPS cancellation resource pattern 625 may be included in the SPS cancellation field. As shown by reference number 625, the SPS cancellation resource pattern 625 may include a set of resources in the time domain and the frequency domain. The resources included in the SPS cancellation resource pattern 625 may preempt SPS resources, associated with scheduled SPS occasions for the UE 120 and the other UEs in the UE 120 group, that overlap with the resources in the SPS cancellation resource pattern 625. The set of resources in the SPS cancellation resource pattern 625 may be identified with any granularity in the frequency domain and/or the time domain. For example, the indication in the SPS cancellation field may identify resources in the frequency domain per RB, per BWP, or per RB group, among other examples. The indication in the SPS cancellation field may identify resources in the time domain per slot, per multiple slots (e.g., with a certain periodicity), per OFDM symbol, or per multiple OFDM symbols (e.g., with a certain periodicity).

In some aspects, the indication may include information that identifies the resources to be included in the SPS cancellation resource pattern 625. For example, the indication, in the SPS cancellation field, may include a two-dimension bit map that identifies the resources in the time domain (e.g., by slot or OFDM symbol) and frequency domain (e.g., by RB or BWP). In this case, the base station 110 may dynamically select the resources to be included in the SPS cancellation resource pattern 625.

In some aspects, the indication may include an index value associated with a configured SPS cancellation resource pattern. For example, as described above, the base station 110 may include, in the SPS configuration transmitted to the UE 120 (or in a separate communication), information identifying a plurality of configured SPS cancellation resource patterns and respective index values associated with the configured SPS resource patterns. In this case, the indication, in the SPS cancellation field, may include the respective index value associated with one of the configured SPS cancellation resource patterns that is selected by the base station 110 as the SPS cancellation resource pattern 625.

As further shown in FIG. 6, and by reference number 630, the UE 120 may selectively cancel monitoring and/or reception of one or more scheduled SPS occasions based at least in part on the SPS cancellation resource pattern 625 indicated in the GC-DCI. In some aspects, the UE 120 may selectively cancel one or more scheduled SPS occasions based at least in part on a determination of whether resources associated with the scheduled SPS occasions overlap with the SPS cancellation resource pattern 625.

As shown in FIG. 6, scheduled SPS occasions 635 for the UE 120 may include SPS occasions 635a, 635b, 635c, 635d, 635e, and 635f. Each scheduled SPS occasion 635 may be associated with a respective resource allocated for a PDSCH transmission to the UE 120 from the base station 110. For each scheduled SPS occasion 635, the UE 120 may determine whether the resource associated with that scheduled SPS occasion 635 overlaps with the SPS cancellation resource pattern 625. The UE 120 may determine that the resource associated with a scheduled SPS occasion 635 overlaps with the SPS cancellation resource pattern 625 based on a determination that the resource overlaps with at least one resource in the SPS cancellation resource pattern 625.

The UE 120 may cancel a scheduled SPS occasion 635 based at least in part on a determination that the scheduled SPS occasion 635 overlaps with the SPS cancellation resource pattern 625. In this case, the UE 120 may skip monitoring and/or reception for of a downlink (e.g., PDSCH) transmission in the canceled SPS occasion 635. The UE 120 may automatically (e.g., without receiving additional signaling from the base station 110) resume monitoring in a next non-canceled scheduled SPS occasion 635 (e.g., a next scheduled SPS occasion 635 that does not overlap with the SPS cancellation resource pattern 625). As shown in FIG. 6, the UE 120 may cancel monitoring and/or reception for downlink transmissions in SPS occasions 635b, 635d, and 635f based at least in part on the resources associated with SPS occasions 635b, 635d, and 635f overlapping with the SPS cancellation resource pattern 625.

In some aspects, the resources in the SPS cancellation resource pattern 625 may preempt only scheduled SPS occasions for the UE 120, and not scheduled aperiodic downlink communications, such as dynamic grant scheduled PDSCH transmissions. In this case, the UE 120 may cancel monitoring and/or reception for downlink transmissions (e.g., PDSCH transmissions) in one or more scheduled SPS occasions (e.g., 635b, 635d, and 635f) based at least in part on determinations that the resources associated with those scheduled SPS occasions (e.g., resources associated with scheduled SPS transmissions) overlap with the SPS cancellation resource pattern 625, without canceling monitoring and/or reception for a dynamic grant scheduled downlink transmission (e.g., a dynamic grant scheduled PDSCH transmission) that is scheduled to be transmitted in a resource that overlaps with the SPS cancellation resource pattern 625.

As described above in connection with FIG. 6, the base station 110 may transmit, to the UE 120 and one or more other UEs in a group of UEs, GC-DCI that includes an indication of an SPS cancellation resource pattern that preempts scheduled SPS occasions for the UEs in the group of UEs. The UE 120 may receive the GC-DCI including the indication of the SPS cancellation resource pattern. The UE 120 may selectively cancel monitoring and/or reception for a downlink transmission in a scheduled SPS occasion based at least in part on a determination of whether a resource associated with the scheduled SPS occasion overlaps with the SPS cancellation resource pattern. As a result, the base station 110 may use a single GC-DCI transmission to temporarily cancel SPS occasions for multiple UEs, resulting in decreased signaling overhead as compared with transmitting SPS cancellation DCI to individual UEs. This may cause increased network speed due to the reduced signaling overhead, and reduced power consumption for the UEs.

As indicated above, FIG. 6 is provided as an example. Other examples may differ from what is described with respect to FIG. 6.

Figure 7:
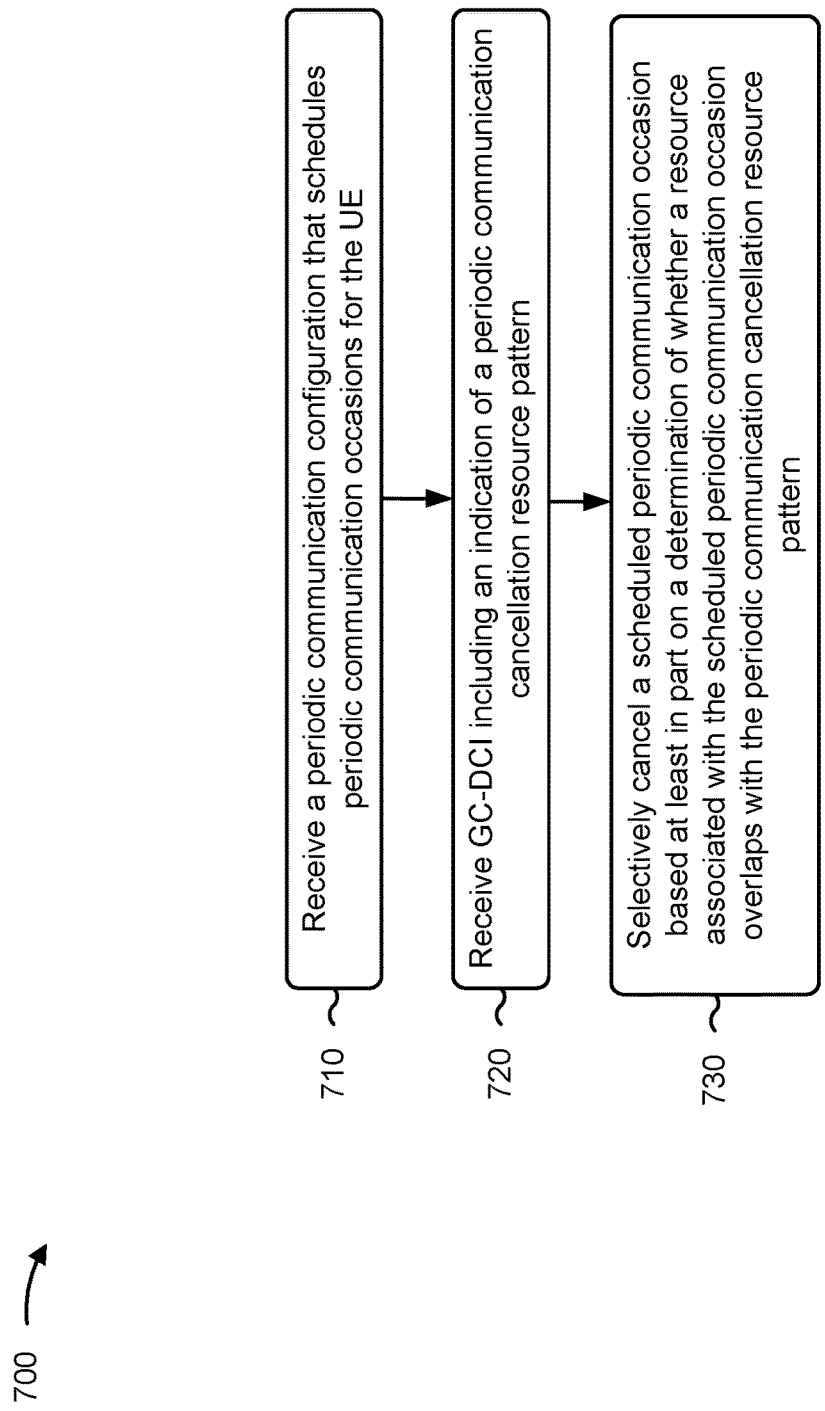
FIGS. 7-8 are diagrams illustrating example processes associated with resource based periodic communication cancellation, in accordance with the present disclosure.

FIG. 7 is a diagram illustrating an example process 700 performed, for example, by a UE, in accordance with the present disclosure. Example process 700 is an example where the UE (e.g., UE 120) performs operations associated with resource based periodic communication cancellation.

As shown in FIG. 7, in some aspects, process 700 may include receiving a periodic communication configuration that schedules periodic communication occasions for the UE (block 710). For example, the UE (e.g., using reception component 902, depicted in FIG. 9) may receive a periodic communication configuration that schedules periodic communication occasions for the UE, as described above, for example, with reference to FIGS. 5 and/or 6.

As shown in FIG. 7, in some aspects, process 700 may include receiving GC-DCI including an indication of a periodic communication cancellation resource pattern, wherein the periodic communication cancellation resource pattern is a set of resources that preempts overlapping scheduled periodic communication occasions for the UE (block 720). For example, the UE (e.g., using reception component 902, depicted in FIG. 9) may receive GC-DCI including an indication of a periodic communication cancellation resource pattern, wherein the periodic communication cancellation resource pattern is a set of resources that preempts overlapping scheduled periodic communication occasions for the UE, as described above, for example, with reference to FIGS. 5 and/or 6.

As further shown in FIG. 7, in some aspects, process 700 may include selectively canceling a scheduled periodic communication occasion based at least in part on a determination of whether a resource associated with the scheduled periodic communication occasion overlaps with the periodic communication cancellation resource pattern (block 730). For example, the UE (e.g., using selection component 908, depicted in FIG. 9) may selectively cancel a scheduled periodic communication occasion based at least in part on a determination of whether a resource associated with the scheduled periodic communication occasion overlaps with the periodic communication cancellation resource pattern, as described above, for example, with reference to FIGS. 5 and/or 6.

Process 700 may include additional aspects, such as any single aspect or any combination of aspects described below and/or in connection with one or more other processes described elsewhere herein.

In a first aspect, the periodic communication cancellation resource pattern is an SPS cancellation resource pattern, the scheduled periodic communication occasion is a scheduled SPS occasion, and selectively canceling the scheduled periodic communication occasion comprises canceling monitoring and/or reception for a downlink transmission in the scheduled SPS occasion based at least in part on a determination that a resource associated with the scheduled SPS transmission overlaps with the SPS cancellation resource pattern.

In a second aspect, alone or in combination with the first aspect, canceling monitoring and/or reception for the downlink transmission in the scheduled SPS occasion comprises canceling monitoring and/or reception for the downlink transmission in the scheduled SPS occasion without canceling monitoring and/or reception for a dynamic grant scheduled downlink transmission scheduled to be transmitted in a resource that overlaps with the SPS cancellation resource pattern.

In a third aspect, the scheduled periodic communication occasion is a scheduled occasion for receiving a periodic reference signal transmission from a base station.

In a fourth aspect, the scheduled periodic communication occasion is a scheduled occasion for transmitting a periodic reference signal to a base station.

In a fifth aspect, the scheduled periodic communication occasion is a periodically scheduled grant-free PUSCH transmission occasion.

In a sixth aspect, alone or in combination with one or more of the first through fifth aspects, the indication identifies the set of resources, in a frequency domain, using one or more resource blocks, one or more bandwidth parts, or one or more resource block groups, the indication identifies the set of resources, in a time domain, using one or more slots or one or more OFDM symbols, and the indication identifies the set of resources, in a spatial domain, using a set of MIMO layers.

In a seventh aspect, alone or in combination with one or more of the first through sixth aspects, the indication includes a multi-dimensional bit map that identifies, in a time domain, a frequency domain, and a spatial domain, a set of resources included in the periodic communication cancellation resource pattern.

In an eighth aspect, alone or in combination with one or more of the first through sixth aspects, the periodic communication cancellation resource pattern is one of a plurality of configured periodic communication cancellation resource patterns associated with respective index values, and the indication includes the respective index value associated with the periodic communication cancellation resource pattern.

In a ninth aspect, alone or in combination with one or more of the first through eighth aspects, the periodic communication configuration includes information identifying the plurality of configured periodic communication cancellation resource patterns and the respective index values associated with the plurality of configured periodic communication cancellation resource patterns.

In a tenth aspect, alone or in combination with one or more of the first through ninth aspects, selectively canceling the scheduled periodic communication occasion comprises canceling the scheduled periodic communication occasion, based at least in part on a determination that the resource associated with the scheduled periodic communication occasion overlaps with the periodic communication cancellation resource pattern, without canceling a scheduled aperiodic communication scheduled to be transmitted or received in a resource that overlaps with the periodic communication cancellation resource pattern.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
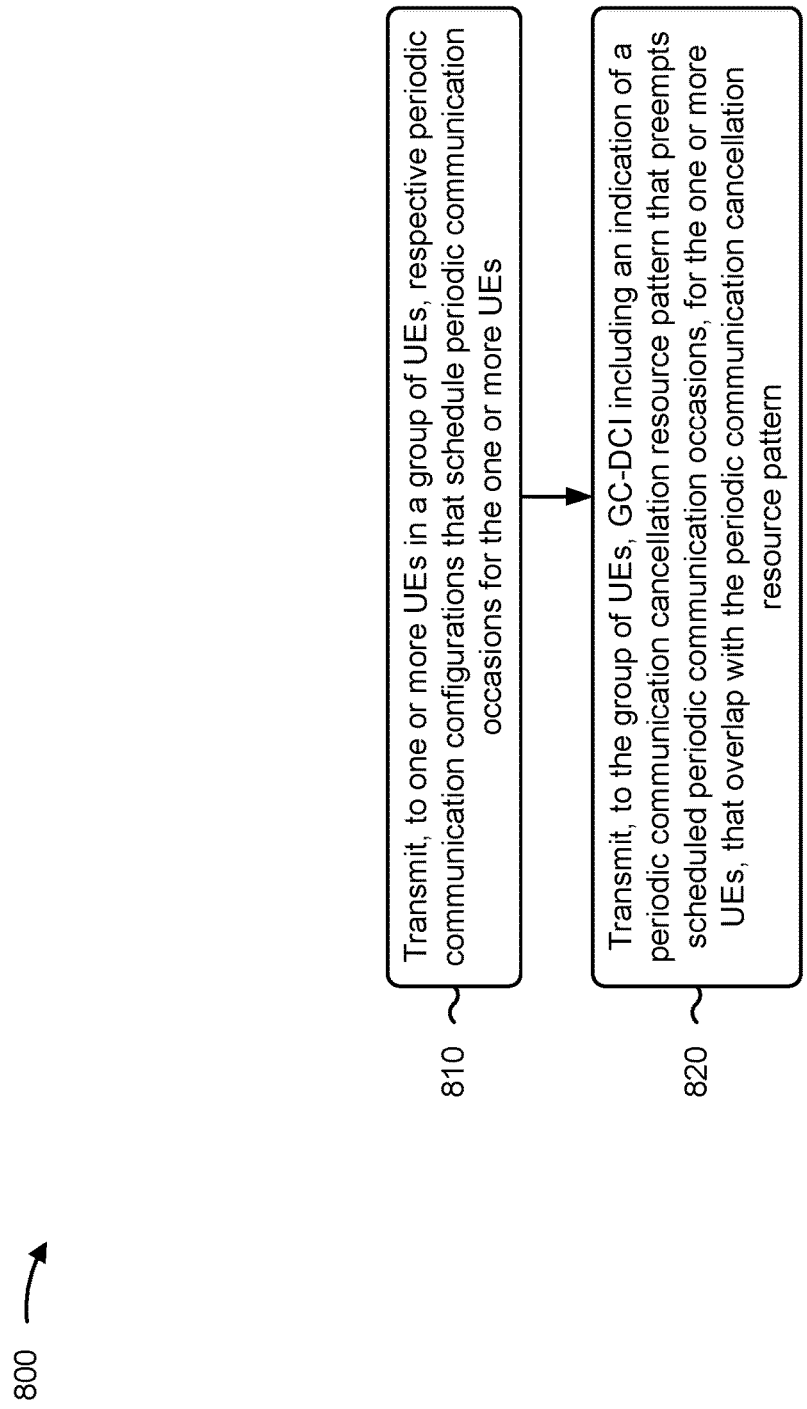

FIG. 8 is a diagram illustrating an example process 800 performed, for example, by a base station, in accordance with the present disclosure. Example process 800 is an example where the base station (e.g., base station 110) performs operations associated with resource based periodic communication cancellation.

As shown in FIG. 8, in some aspects, process 800 may include transmitting, to one or more UEs in a group of UEs, respective periodic communication configurations that schedule periodic communication occasions for the one or more UEs (block 810). For example, the base station (e.g., using transmission component 1004, depicted in FIG. 10) may transmit, to one or more UEs in a group of UEs, respective periodic communication configurations that schedule periodic communication occasions for the one or more UEs, as described above, for example, with reference to FIGS. 5 and/or 6.

As further shown in FIG. 8, in some aspects, process 800 may include transmitting, to the group of UEs, GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern (block 820). For example, the base station (e.g., using transmission component 1004, depicted in FIG. 10) may transmit, to the group of UEs, GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern, as described above, for example, with reference to FIGS. 5 and/or 6.

Process 800 may include additional aspects, such as any single aspect or any combination of aspects described below and/or in connection with one or more other processes described elsewhere herein.

In a first aspect, the periodic communication cancellation resource pattern is an SPS cancellation resource pattern that preempts scheduled SPS occasions, for the one or more UEs, that overlap with the SPS cancellation resource pattern.

In a second aspect, alone or in combination with the first aspect, the scheduled periodic communication occasions include scheduled occasions, for the one or more UEs, for receiving a periodic reference signal transmission from the base station.

In a third aspect, alone or in combination with one or more of the first and second aspects, the scheduled periodic communication occasions include scheduled occasions, for the one or more UEs, for transmitting a periodic reference signal to the base station.

In a fourth aspect, alone or in combination with one or more of the first through third aspects, the scheduled periodic communication occasions include periodically scheduled grant-free PUSCH transmission occasions for the one or more UEs.

In a fifth aspect, alone or in combination with one or more of the first through fourth aspects, the indication identifies the set of resources, in a frequency domain, using one or more resource blocks, one or more bandwidth parts, or one or more resource block groups, the indication identifies the set of resources, in a time domain, using one or more slots or one or more OFDM symbols, and the indication identifies the set of resources, in a spatial domain, using a set of MIMO layers.

In a sixth aspect, alone or in combination with one or more of the first through fifth aspects, the indication includes a multi-dimensional bit map that identifies, in a time domain, a frequency domain, and a spatial domain, a set of resources included in the periodic communication cancellation resource pattern.

In a seventh aspect, alone or in combination with one or more of the first through sixth aspects, the periodic communication cancellation resource pattern is one of a plurality of configured periodic communication cancellation resource patterns associated with respective index values, and the indication includes the respective index value associated with the periodic communication cancellation resource pattern.

In an eighth aspect, alone or in combination with one or more of the first through seventh aspects, the respective periodic communication configurations include information identifying the plurality of configured periodic communication cancellation resource patterns and the respective index values associated with the plurality of configured periodic communication cancellation resource patterns.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
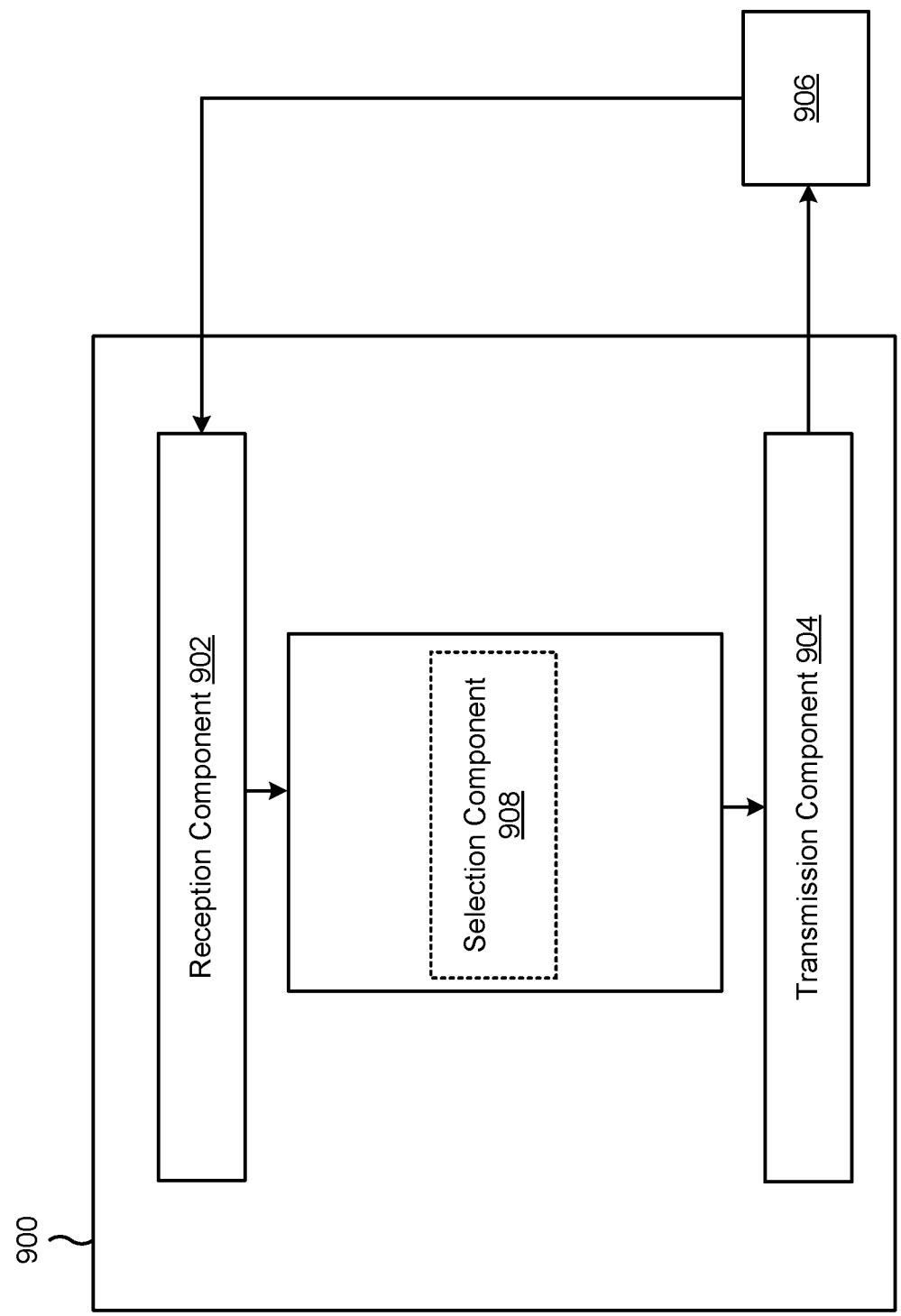
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a selection component 908, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive a periodic communication configuration that schedules periodic communication occasions for the UE. The reception component 902 may receive GC-DCI including an indication of a periodic communication cancellation resource pattern, wherein the periodic communication cancellation resource pattern is a set of resources that preempts overlapping scheduled periodic communication occasions for the UE. The selection component 908 may selectively cancel a scheduled periodic communication occasion based at least in part on a determination of whether a resource associated with the scheduled periodic communication occasion overlaps with the periodic communication cancellation resource pattern.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
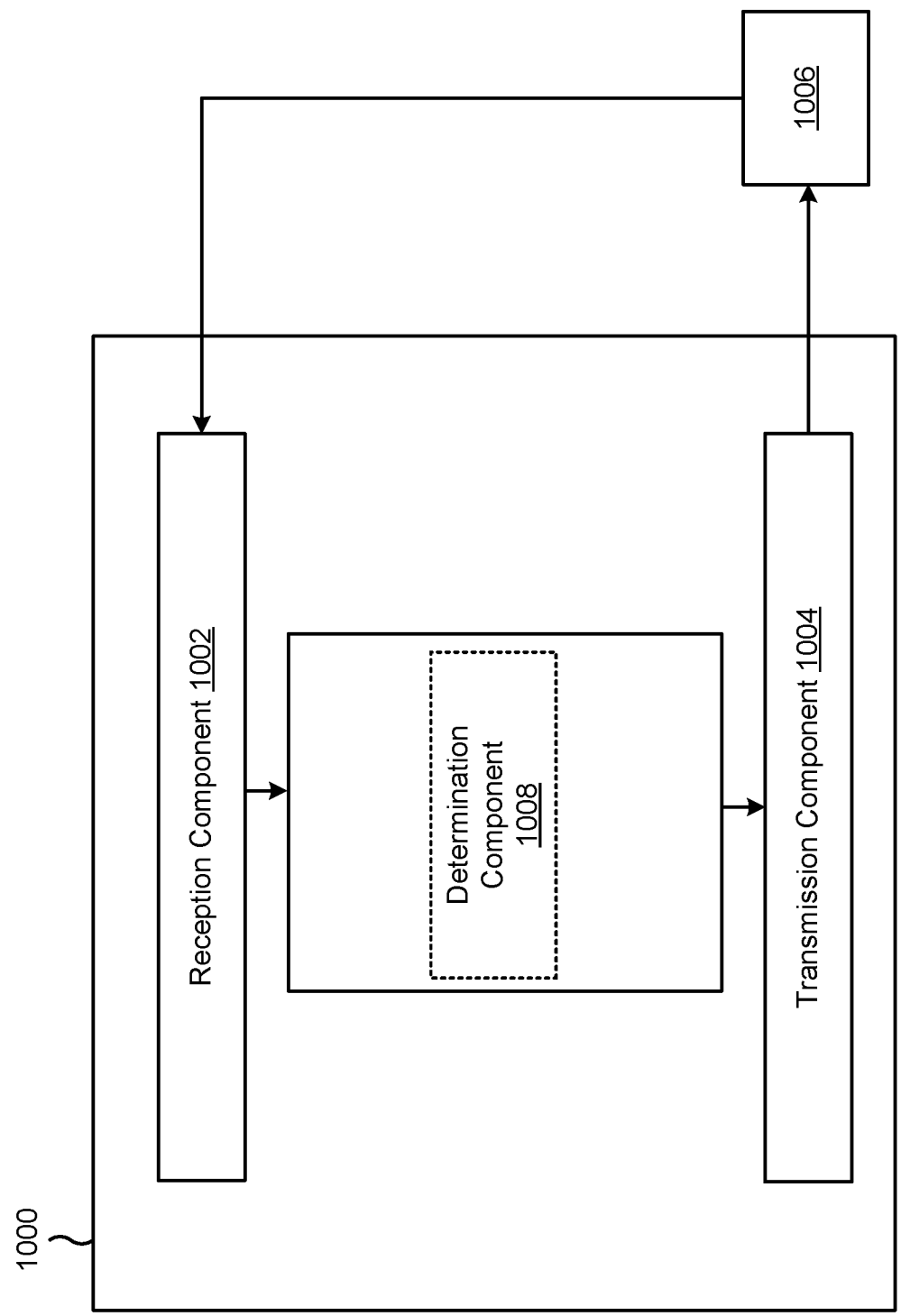

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit, to one or more UEs in a group of UEs, respective periodic communication configurations that schedule periodic communication occasions for the one or more UEs. The transmission component 1004 may transmit, to the group of UEs, GC-DCI including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern. The determination component 1008 may determine the periodic communication cancellation resource pattern.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a periodic communication configuration that schedules periodic communication occasions for the UE; receiving group common downlink control information (GC-DCI) including an indication of a periodic communication cancellation resource pattern, wherein the periodic communication cancellation resource pattern is a set of resources that preempts overlapping scheduled periodic communication occasions for the UE; and selectively canceling a scheduled periodic communication occasion based at least in part on a determination of whether a resource associated with the scheduled periodic communication occasion overlaps with the periodic communication cancellation resource pattern.

Aspect 2: The method of Aspect 1, wherein the periodic communication cancellation resource pattern is a semi-persistent scheduling (SPS) cancellation resource pattern, the scheduled periodic communication occasion is a scheduled SPS occasion, and selectively canceling the scheduled periodic communication occasion comprises: canceling monitoring and/or reception for a downlink transmission in the scheduled SPS occasion based at least in part on a determination that a resource associated with the scheduled SPS transmission overlaps with the SPS cancellation resource pattern.

Aspect 3: The method of Aspect 2, wherein canceling monitoring and/or reception for the downlink transmission in the scheduled SPS occasion comprises: canceling monitoring and/or reception for the downlink transmission in the scheduled SPS occasion without canceling monitoring and/or reception for a dynamic grant scheduled downlink transmission scheduled to be transmitted in a resource that overlaps with the SPS cancellation resource pattern.

Aspect 4: The method of Aspect 1, wherein the scheduled periodic communication occasion is a scheduled occasion for receiving a periodic reference signal transmission from a base station.

Aspect 5: The method of Aspect 1, wherein the scheduled periodic communication occasion is a scheduled occasion for transmitting a periodic reference signal to a base station.

Aspect 6: The method of Aspect 1, wherein the scheduled periodic communication occasion is a periodically scheduled grant-free physical uplink shared channel (PUSCH) transmission occasion.

Aspect 7: The method of any of Aspects 1-6, wherein the indication identifies the set of resources, in a frequency domain, using one or more resource blocks, one or more bandwidth parts, or one or more resource block groups, the indication identifies the set of resources, in a time domain, using one or more slots or one or more orthogonal frequency-division multiplexing (OFDM) symbols, and the indication identifies the set of resources, in a spatial domain, using a set of multiple-input multiple-output (MIMO) layers.

Aspect 8: The method of any of Aspects 1-7, wherein the indication includes a multi-dimensional bit map that identifies, in a time domain, a frequency domain, and a spatial domain, a set of resources included in the periodic communication cancellation resource pattern.

Aspect 9: The method of any of Aspects 1-7, wherein the periodic communication cancellation resource pattern is one of a plurality of configured periodic communication cancellation resource patterns associated with respective index values, and the indication includes the respective index value associated with the periodic communication cancellation resource pattern.

Aspect 10: The method of Aspect 9, wherein the periodic communication configuration includes information identifying the plurality of configured periodic communication cancellation resource patterns and the respective index values associated with the plurality of configured periodic communication cancellation resource patterns.

Aspect 11: The method of any of Aspects 1-10, wherein selectively canceling the scheduled periodic communication occasion comprises: canceling the scheduled periodic communication occasion, based at least in part on a determination that the resource associated with the scheduled periodic communication occasion overlaps with the periodic communication cancellation resource pattern, without canceling a scheduled aperiodic communication scheduled to be transmitted or received in a resource that overlaps with the periodic communication cancellation resource pattern.

Aspect 12: A method of wireless communication performed by a base station, comprising: transmitting, to one or more user equipments (UEs) in a group of UEs, respective periodic communication configurations that schedule periodic communication occasions for the one or more UEs; and transmitting, to the group of UEs, group common downlink control information (GC-DCI) including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern.

Aspect 13: The method of Aspect 12, wherein the periodic communication cancellation resource pattern is a semi-persistent scheduling (SPS) cancellation resource pattern that preempts scheduled SPS occasions, for the one or more UEs, that overlap with the SPS cancellation resource pattern.

Aspect 14: The method of Aspect 12, wherein the scheduled periodic communication occasions include scheduled occasions, for the one or more UEs, for receiving a periodic reference signal transmission from the base station.

Aspect 15: The method of Aspect 12, wherein the scheduled periodic communication occasions include scheduled occasions, for the one or more UEs, for transmitting a periodic reference signal to the base station.

Aspect 16: The method of Aspect 12, wherein the scheduled periodic communication occasions include periodically scheduled grant-free physical uplink shared channel (PUSCH) transmission occasions for the one or more UEs.

Aspect 17: The method of any of Aspects 12-16, wherein the indication identifies the set of resources, in a frequency domain, using one or more resource blocks, one or more bandwidth parts, or one or more resource block groups, the indication identifies the set of resources, in a time domain, using one or more slots or one or more orthogonal frequency-division multiplexing (OFDM) symbols, and the indication identifies the set of resources, in a spatial domain, using a set of multiple-input multiple-output (MIMO) layers.

Aspect 18: The method of any of Aspects 12-17, wherein the indication includes a multi-dimensional bit map that identifies, in a time domain, a frequency domain, and a spatial domain, a set of resources included in the periodic communication cancellation resource pattern.

Aspect 19: The method of any of Aspects 12-17, wherein the periodic communication cancellation resource pattern is one of a plurality of configured periodic communication cancellation resource patterns associated with respective index values, and the indication includes the respective index value associated with the periodic communication cancellation resource pattern.

Aspect 20: The method of Aspect 19, wherein the respective periodic communication configurations include information identifying the plurality of configured periodic communication cancellation resource patterns and the respective index values associated with the plurality of configured periodic communication cancellation resource patterns.

Aspect 21: An apparatus for wireless communication at a device, comprising a processor; memory coupled with the processor; and instructions stored in the memory and executable by the processor to cause the apparatus to perform the method of one or more Aspects of Aspects 1-11.

Aspect 22: An apparatus for wireless communication at a device, comprising a processor; memory coupled with the processor; and instructions stored in the memory and executable by the processor to cause the apparatus to perform the method of one or more Aspects of Aspects 12-20.

Aspect 23: A device for wireless communication, comprising a memory and one or more processors coupled to the memory, the memory and the one or more processors configured to perform the method of one or more Aspects of Aspects 1-11.

Aspect 24: A device for wireless communication, comprising a memory and one or more processors coupled to the memory, the memory and the one or more processors configured to perform the method of one or more Aspects of Aspects 12-20.

Aspect 25: An apparatus for wireless communication, comprising at least one means for performing the method of one or more Aspects of Aspects 1-11.

Aspect 26: An apparatus for wireless communication, comprising at least one means for performing the method of one or more Aspects of Aspects 12-20.

Aspect 27: A non-transitory computer-readable medium storing code for wireless communication, the code comprising instructions executable by a processor to perform the method of one or more Aspects of Aspects 1-11.

Aspect 28: A non-transitory computer-readable medium storing code for wireless communication, the code comprising instructions executable by a processor to perform the method of one or more Aspects of Aspects 12-20.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-11.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 12-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a periodic communication configuration that schedules periodic communication occasions for the UE;
   receiving group common downlink control information (GC-DCI) including an indication of a periodic communication cancellation resource pattern, wherein the periodic communication cancellation resource pattern is a set of resources that preempts overlapping scheduled periodic communication occasions for the UE; and
   canceling reception of a downlink transmission in a scheduled periodic communication occasion based at least in part on a resource associated with the scheduled periodic communication occasion overlapping with the periodic communication cancellation resource pattern.

2. The method of claim 1, wherein the periodic communication cancellation resource pattern is a semi-persistent scheduling (SPS) cancellation resource pattern, and wherein the scheduled periodic communication occasion is a scheduled SPS occasion.

3. The method of claim 1, wherein canceling reception of the downlink transmission in the scheduled periodic communication occasion comprises:
   canceling reception of the downlink transmission in the scheduled period communication occasion without canceling reception of a dynamic grant scheduled downlink transmission scheduled to be transmitted in the resource that overlaps with the periodic communication cancellation resource pattern.

4. The method of claim 1, wherein the scheduled periodic communication occasion is a scheduled occasion for receiving a periodic reference signal transmission from a base station.

5. The method of claim 1, wherein the scheduled periodic communication occasion is a scheduled occasion for transmitting a periodic reference signal to a base station.

6. The method of claim 1, wherein the scheduled periodic communication occasion is a periodically scheduled grant-free physical uplink shared channel (PUSCH) transmission occasion.

7. The method of claim 1, wherein at least one of:
   the indication identifies the set of resources, in a frequency domain, using one or more resource blocks, one or more bandwidth parts, or one or more resource block groups,
   the indication identifies the set of resources, in a time domain, using one or more slots or one or more orthogonal frequency-division multiplexing (OFDM) symbols, or
   the indication identifies the set of resources, in a spatial domain, using a set of multiple-input multiple-output (MIMO) layers.

8. The method of claim 1, wherein the indication includes a multi-dimensional bit map that identifies, in a time domain, a frequency domain, and a spatial domain, a set of resources included in the periodic communication cancellation resource pattern.

9. The method of claim 1, wherein the periodic communication cancellation resource pattern is one of a plurality of configured periodic communication cancellation resource patterns associated with respective index values, and the indication includes the respective index value associated with the periodic communication cancellation resource pattern.

10. The method of claim 9, wherein the periodic communication configuration includes information identifying the plurality of configured periodic communication cancellation resource patterns and the respective index values associated with the plurality of configured periodic communication cancellation resource patterns.

11. The method of claim 1, wherein canceling reception of the downlink transmission in the scheduled periodic communication occasion comprises:
canceling reception of the downlink transmission in the scheduled periodic communication occasion, based at least in part on the resource associated with the scheduled periodic communication occasion overlapping with the periodic communication cancellation resource pattern, without canceling a scheduled aperiodic communication scheduled to be transmitted or received in a resource that overlaps with the periodic communication cancellation resource pattern.

12. A method of wireless communication performed by a base station, comprising:
transmitting, to one or more user equipments (UEs) in a group of UEs, respective periodic communication configurations that schedule periodic communication occasions for the one or more UEs; and
transmitting, to the group of UEs, group common downlink control information (GC-DCI) including an indication of a periodic communication cancellation resource pattern that is a set of resources that preempts scheduled periodic communication occasions, for the one or more UEs, that overlap with the periodic communication cancellation resource pattern,
wherein the indication identifies the set of resources in at least one of a frequency domain, a time domain, or a spatial domain, and
wherein at least one of:
the indication identifies the set of resources, in the frequency domain, using one or more resource blocks, one or more bandwidth parts, or one or more resource block groups,
the indication identifies the set of resources, in the time domain, using one or more slots or one or more orthogonal frequency-division multiplexing (OFDM) symbols, or
the indication identifies the set of resources, in the spatial domain, using a set of multiple-input multiple-output (MIMO) layers.

13. The method of claim 12, wherein the periodic communication cancellation resource pattern is a semi-persistent scheduling (SPS) cancellation resource pattern that preempts scheduled SPS occasions, for the one or more UEs, that overlap with the SPS cancellation resource pattern.

14. The method of claim 12, wherein the scheduled periodic communication occasions include scheduled occasions, for the one or more UEs, for receiving a periodic reference signal transmission from the base station.

15. The method of claim 12, wherein the scheduled periodic communication occasions include scheduled occasions, for the one or more UEs, for transmitting a periodic reference signal to the base station.

16. The method of claim 12, wherein the scheduled periodic communication occasions include periodically scheduled grant-free periodic physical uplink shared channel (PUSCH) transmission occasions for the one or more UEs.

17. The method of claim 12, wherein at least two of:
the indication identifies the set of resources, in the frequency domain, using one or more resource blocks, one or more bandwidth parts, or one or more resource block groups,
the indication identifies the set of resources, in the time domain, using one or more slots or one or more orthogonal frequency-division multiplexing (OFDM) symbols, and
the indication identifies the set of resources, in the spatial domain, using a set of multiple-input multiple-output (MIMO) layers.

18. The method of claim 12, wherein the indication includes a multi-dimensional bit map that identifies, in a time domain, a frequency domain, and a spatial domain, a set of resources included in the periodic communication cancellation resource pattern.

19. The method of claim 12, wherein the periodic communication cancellation resource pattern is one of a plurality of configured periodic communication cancellation resource patterns associated with respective index values, and the indication includes the respective index value associated with the periodic communication cancellation resource pattern.

20. The method of claim 19, wherein the respective periodic communication configurations include information identifying the plurality of configured periodic communication cancellation resource patterns and the respective index values associated with the plurality of configured periodic communication cancellation resource patterns.

21. A user equipment (UE) for wireless communication, comprising:
a memory; and
one or more processors, coupled to the memory, configured to:
receive a periodic communication configuration that schedules periodic communication occasions for the UE;
receive group common downlink control information (GC-DCI) including an indication of a periodic communication cancellation resource pattern, wherein the periodic communication cancellation resource pattern is a set of resources that preempts overlapping scheduled periodic communication occasions for the UE; and
cancel reception of a downlink transmission in a scheduled periodic communication occasion based at least in part on a resource associated with the scheduled periodic communication occasion overlapping with the periodic communication cancellation resource pattern.

22. The UE of claim 21, wherein the periodic communication cancellation resource pattern is a semi-persistent scheduling (SPS) cancellation resource pattern, the scheduled periodic communication occasion is a scheduled SPS occasion.

23. The UE of claim 21, wherein at least one of:
the indication identifies the set of resources, in a frequency domain, using one or more resource blocks, one or more bandwidth parts, or one or more resource block groups, the indication identifies the set of resources, in a time domain, using one or more slots or one or more orthogonal frequency-division multiplexing (OFDM) symbols, or the indication identifies the set of resources, in a spatial domain, using a set of multiple-input multiple-output (MIMO) layers.

24. The UE of claim 21, wherein the indication includes a multi-dimensional bit map that identifies, in a time domain, a frequency domain, and a spatial domain, a set of resources included in the periodic communication cancellation resource pattern.

25. The UE of claim 21, wherein the periodic communication cancellation resource pattern is one of a plurality of configured periodic communication cancellation resource patterns associated with respective index values, and the indication includes the respective index value associated with the periodic communication cancellation resource pattern.

26. A base station for wireless communication, comprising:
a memory; and
one or more processors, coupled to the memory, configured to:
transmit, to one or more user equipments (UEs) in a group of UEs, respective periodic communication configurations that schedule periodic communication occasions for the one or more UEs; and
transmit, to the group of UEs, group common downlink control information (GC-DCI) including an indication of a periodic communication cancellation resource pattern, wherein the periodic communication cancellation resource pattern is a set of resources that preempts scheduled periodic communication occasions, for the one or more UEs, that overlap with the periodic communication cancellation resource pattern,
wherein the indication identifies the set of resources in at least one of a frequency domain, a time domain, or a spatial domain, and
wherein at least one of:
the indication identifies the set of resources, in the frequency domain, using one or more resource blocks, one or more bandwidth parts, or one or more resource block groups,
the indication identifies the set of resources, in the time domain, using one or more slots or one or more orthogonal frequency-division multiplexing (OFDM) symbols, or
the indication identifies the set of resources, in the spatial domain, using a set of multiple-input multiple-output (MIMO) layers.

27. The base station of claim 26, wherein the periodic communication cancellation resource pattern is a semi-persistent scheduling (SPS) cancellation resource pattern that preempts scheduled SPS occasions, for the one or more UEs, that overlap with the SPS cancellation resource pattern.

28. The base station of claim 26, wherein at least two of:
the indication identifies the set of resources, in the frequency domain, using one or more resource blocks, one or more bandwidth parts, or one or more resource block groups,
the indication identifies the set of resources, in the time domain, using one or more slots or one or more orthogonal frequency-division multiplexing (OFDM) symbols, and
the indication identifies the set of resources, in the spatial domain, using a set of multiple-input multiple-output (MIMO) layers.

29. The base station of claim 26, wherein the indication includes a multi-dimensional bit map that identifies, in a time domain, a frequency domain, and a spatial domain, a set of resources included in the periodic communication cancellation resource pattern.

30. The base station of claim 26, wherein the periodic communication cancellation resource pattern is one of a plurality of configured periodic communication cancellation resource patterns associated with respective index values, and the indication includes the respective index value associated with the periodic communication cancellation resource pattern.

* * * * *